INVENTOR:
PAUL J. MORAN,
HIS ATTORNEY

United States Patent Office 3,592,695
Patented July 13, 1971

3,592,695
METAL-AIR CELL INCLUDING A COMPOSITE LAMINAR GAS DIFFUSION CATHODE
Paul J. Moran, Ballston Lake, N.Y., assignor to
General Electric Company
Filed Nov. 1, 1968, Ser. No. 772,585
Int. Cl. H01m 27/00
U.S. Cl. 136—86                                2 Claims

ABSTRACT OF THE DISCLOSURE

A composite gas diffusion electrode has an electrically conductive porous substrate, non-noble metal catalytic material impregnated into the substrate, at least one chemically inert porous separator positioned adjacent one surface of the catalytically impregnated substrate, and a porous, electrically conductive sheet positioned adjacent the opposite surface of the separator and in electrical contact with the substrate, the porous sheet having a lower oxygen overvoltage than the substrate. During the charging of a cell employing the above electrode, the porous sheet provides isolation of oxygen gassing at the porous sheet while the porous separator provides physical spacing of the oxygen gassing at the porous sheet from the catalytically impregnated substrate.

COMPOSITE GAS DIFFUSION ELECTRODE

Figure 1:
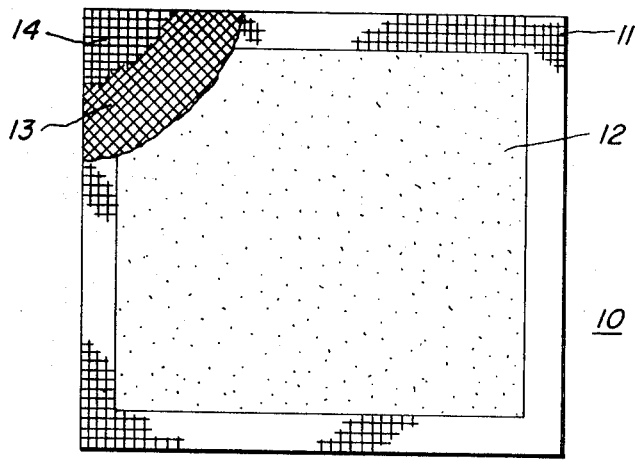

This invention relates to composite gas diffusion electrodes and, more particularly, to composite gas diffusion electrodes in which a non-noble metal catalytic material is deposited into an electrically conductive, porous substrate for employment in secondary electrochemical cells.

The invention described herein was made under Contract No. DAAB–07–67C–0257 with the Department of the Army.

A secondary metal-air cell is a galvanic cell which uses an oxidant of oxygen, or oxygen from the air as the reactive material consumed at the positive electrode of the cell. The oxygen thereby serves as the cathode depolarizer. Such a cell employs generally an alkaline electrolyte. A gas diffusion cathode is used generally which has an electrically conductive, porous substrate and catalytic material deposited into the substrate. Cadmium and zinc are commonly used anode materials in such cells since they are generally low in cost and light in weight.

In such a secondary cell a problem exists during charging in which the porous substrate of the cathode, which includes a metal such as nickel, oxidizes during the evolution of oxygen at this electrode. Such substrate oxidation occurs without regard to the type of catalyst material which is employed for the electrode. This oxidation results in problems during subsequent cell discharge of electrolyte wetting of the cathode which reduces cathode life, and of elevated voltage in the initiation of discharge which requires separate control equipment to reduce the voltage to its normal condition.

In my copending patent application (RD–2449) filed Sept. 3, 1968, Ser. No. 756,795, there is disclosed and claimed a composite gas diffusion electrode which eliminates the above problem of cathode substrate oxidation during cell charging. My copending patent application is assigned to the same assignee as the present application.

During the charging of the above type of secondary cell employing a cathode with a non-noble metal catalyst, a second severe problem exists. The oxygen evolution at this electrode destroys or severely damages the non-noble metal catalyst. Noble metal catalysts are not subject to catalyst oxidation damage of this type. Thus, while a low cost non-noble metal catalytically deposited gas diffusion electrode would be highly desirable in a secondary electrochemical cell, non-noble metal catalysts are destructively sensitive to oxidation.

My present invention is directed to an improved composite gas diffusion electrode with a non-noble metal catalyst which eliminates both of the above problems of substrate oxidation and catalyst destruction by oxygen evolution during cell charging.

It is a primary object of my invention to provide an inexpensive composite gas diffusion electrode with a non-noble metal catalyst for a secondary electrochemical cell in which neither the catalyst nor the substrate is damaged by oxygen evolution during cell charging.

In accordance with my invention, a composite gas diffusion electrode comprises an electrically conductive, porous substrate, non-noble metal catalytic material deposited into the substrate, at least one chemically inert, porous separator positioned adjacent one surface of the catalytically impregnated substrate, and a porous, electrically conductive sheet positioned adjacent the opposite surface of the separator and in electrical contact with the substrate, the porous sheet having a lower oxygen overvoltage than the substrate.

Figure 2:
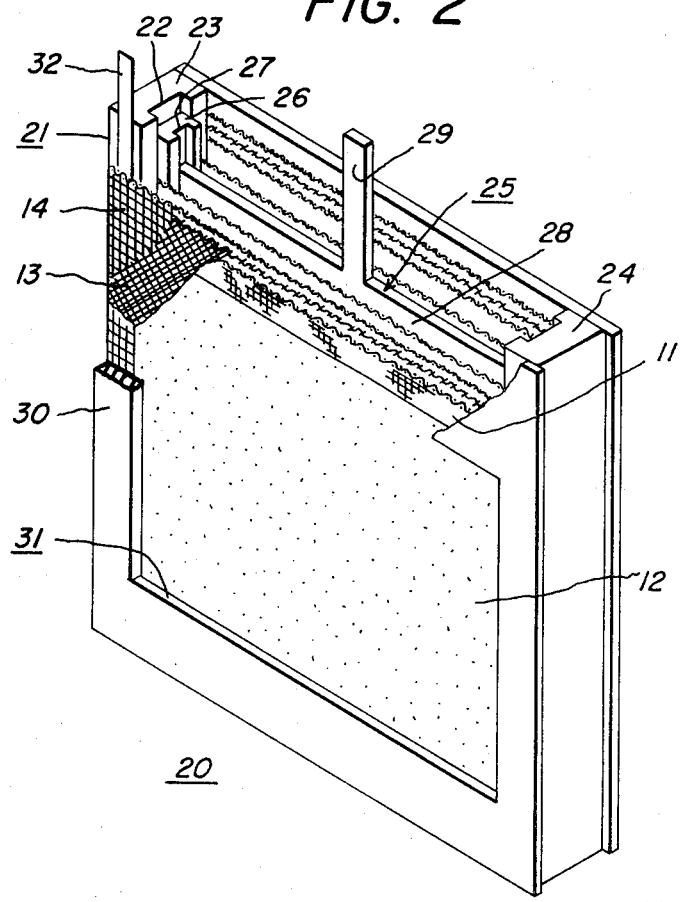

These and various other objects, features and advantages of the invention will be better understood from the following description taken in connection with the accompanying drawing in which:

FIG. 1 is an elevational view partially in section of a composite gas diffusion electrode embodying my invention; and FIG. 2 is a perspective view of a metal-air cell employing a pair of electrodes as shown in FIG. 1.

In FIG. 1 of the drawing, there is shown generally at 10 a composite gas diffusion electrode embodying my invention. Electrode 10 comprises an electrically conductive, porous substrate 11 which is shown as a sintered nickel plaque, with non-noble metal catalytic material 12, which is shown as a nickel cobalt spinel and a binder deposited into substrate 11. The catalytic material is bonded to substrate 11 by a binder of a suitable material, such as polytetrafluoroethylene. Additionally, the exterior face of the catalytic material 12 may be coated with a thin film of polytetrafluoroethylene to provide waterproofing for the electrode. A chemically inert, porous separator 13 of a material, such as unwoven nylon plastic fabric, is positioned adjacent one surface of non-noble metal catalytically impregnated substrate 11. A porous, electrically conductive sheet 14 is positioned adjacent the opposite surface of the porous separator and in electrical contact with substrate 11. Sheet 14 is shown in the form of a porous stainless steel screen which has a lower oxygen overvoltage than substrate 11. Sheet 14 can be connected electrically to substrate 11 by attachment in various well-known manners such as welding or by electrical leads.

I have discovered that an improved gas diffusion electrode can be constructed by employing an electrically conductive, porous substrate with non-noble metal catalytic material deposited therein, at least one chemically inert, porous separator positioned adjacent one surface of the catalytically impregnated substrate, and a porous, electrically conductive sheet of lower oxygen overvoltage than the substrate positioned adjacent the opposite surface of the separator and in electrical contact with the substrate.

The substrate is usually a metal, such as nickel, or has a metallic coating thereon and is usually in the form of a screen, a plaque, or a powder. The catalytic material is non-noble metal material deposited into the substrate with a binder. Suitable non-noble metal catalysts include activated carbons; spinels, such as cobalt aluminate and nickel cobalt; silver; supported silver; etc. For such an electrode, the porous, electrically conductive sheet, which must have a lower oxygen overvoltage than the substrate, can be selected from or coated with metals including iron, cobalt, their respective alloys, steels and stainless steels, since these materials have a lower oxygen overvoltage than the substrate nickel.

The porous, electrically conductive sheet can be formed in a variety of configurations including plaques, screens, wires, punched plate, expanded sheet, porous sheet, etc. Such sheet is connected electrically to the substrate in various satisfactory manners, such as by welding, by electrical lead, etc.

At a current density of 100 milliamperes per square centimeter, the overvoltage values in a 36 percent potassium hydroxide solution of nickel, iron and cobalt in volts to a standard hydrogen reference are 0.92, 0.57 and 0.54 volt, respectively. When the porous sheet is made of or coated with such a lower oxygen overvoltage material and connected electrically to the substrate as described above, the oxygen evolution during cell charging is at the porous sheet in preference to the substrate with impregnated catalytic material. Thus, substrate oxidation is eliminated during cell charging. During subsequent cell discharge, there is no wetting of this electrode and no elevated voltage at the initiation of the discharge.

At least one chemically inert, porous separator is provided between the catalytically deposited substrate and the porous sheet to space apart the substrate and sheet. During cell charging, the oxygen evolution at the porous sheet is separated from the non-noble metal catalyst material thereby preventing severe damage or destruction of the catalyst material. The separator distributes also more uniformly the cell electrolyte to the catalytically impregnated substrate. While one porous separator is utilized effectively in my improved composite electrode, a plurality of layers can be employed to increase further the physical separation of the catalytically impregnated substrate and the porous sheet. Additionally, one separator layer can be of a membrane barrier type, such as cellophane. Various materials are suitable for employment as separators in my electrode structure which include unwoven nylon plastic fabric, unwoven Dynel plastic fabric, etc. Various membrane barrier type separator materials include cellophane, chemically grafted porous polymers, radiation grafted porous polymers, etc.

In FIG. 2 of the drawing, there is shown generally at 20 an improved metal-air cell embodying the composite gas diffusion electrode of my invention. Cell 20 has a casing 21 in the form of a U-shaped frame. A vertical groove 22 is provided for each of the opposite frame members 23 and 24. A unit 25, which is positioned in grooves 22 of members 23 and 24 of casing 21, comprises a pair of spaced guides 26, each of which is provided with a vertical groove 27 to receive an edge of a cadmium anode plate 28. A terminal strip 29 is formed integrally with plate 28 and extends upwardly and outwardly from guides 26.

On opposite outer surfaces of casing 21, a gas diffusion electrode 10 from FIG. 1 of the drawing is shown sealed thereto. A face piece 30 is sealed to each of the opposite surfaces of casing 21 and overlies the edges of substrate 11. Each of the face pieces 30 is provided with a large opening 31 whereby each electrode 10 lying within open portion 31 forms the gas permeable, liquid impermeable cathode which is co-extensive with opening 31. A terminal strip 32 is attached to substrate 11 at its edge to provide an electrical connection for the cathode. Porous sheet 14 faces anodes 28 and will contact the aqueous electrolyte.

I found also an improved method of charging the above secondary metal-air cell which comprises assembling the metal-air cell as described above, and applying a charging current across the anode and cathode. During charging, oxygen evolution occurred at the porous, electrically conductive sheet and not at the substrate thereby protecting the substrate with catalytic material from oxidation with subsequent elimination of electrolyte wetting of the electrode and of elevated voltage upon initial discharge. Secondly, the oxygen evolution at the conductive sheet was spaced physically by a porous separator from the non-noble metal catalyst of the cathode thereby protecting the catalyst from severe damage or destruction. Additionally, I found further an improved method of generating electrical energy from a secondary metal-air cell comprises assembling the metal-air cell as described above, and applying an electrical load across the anode chemical cells employing the electrodes from Examples and cathode.

An example of a gas diffusion electrode which was not made in accordance with my invention is set forth below in Example 1. An example of a composite gas diffusion electrode which was made in accordance with my invention is set forth below in Example 2. In Example 3, the performance is compared of two electrochemical cells employing the electrodes from Examples 1 and 2, respectively.

EXAMPLE 1

A gas diffusion electrode was prepared with a nickel cobalt spinel deposited in a sintered nickel plaque impregnated with polytetrafluoroethylene. The resulting structure, a gas diffusion electrode containing a non-noble metal catalyst, was employed subsequently as a cathode in an electrochemical cell as set forth below in Example 2.

EXAMPLE 2

A composite gas diffusion electrode was prepared by initially using a non-noble metal catalytically deposited substrate as set forth above in Example 1. A separator structure was assembled from a layer of unwoven nylon plastic fabric, a layer of crosslinked high molecular polyethylene, methacrylic acid grafted material for a membrane barrier, and a second layer of unwoven nylon plastic fabric. This separator structure was positioned adjacent one surface of the substrate. A porous sheet of expanded stainless steel 316 was positioned against the opposite surface of the separator structure thereby spacing the non-noble metal catalytically deposited substrate from the porous sheet. The substrate and porous sheet were connected electrically by welding two opposed edges of the substrate to two opposed edges of the porous sheet. The resulting composite gas diffusion electrode was employed subsequently as a cathode in an electrochemical cell as set forth below in Example 3.

EXAMPLE 3

Two electrochemical cells were assembled in which the respective cathodes were the gas diffusion electrodes from Examples 1 and 2. Each cell had a conventional cadmium battery plaque anode and an aqueous electrolyte of 31 weight percent potassium hydroxide in contact with the electrodes. Air was supplied to the cathode.

Both of these cells were cycled by charging and by subsequent discharging. The cell incorporating the cathode from Example 1 had a useful polarization life of less than 1.0 ampere hour per square centimeter. However, the cell incorporating the cathode from Example 2 had a useful polarization life in excess of 10.3 ampere hours per square centimeter.

While other modifications of the invention and variations thereof which may be employed within the scope of the invention have not been described, the invention is intended to include such as may be embraced within the following claims:

What I claim as new and desire to secure by Letters Patent of the United States is:

1. A metal-air cell including a composite laminar gas diffusion cathode comprising an electrically conductive, porous substrate, and non-noble metal catalytic material deposited into the substrate, a porous, electrically conductive sheet positioned in electrical contact with the substrate, and at least one chemically inert, porous, electrically non-conductive separator interposed between said substrate and said conductive sheet, the porous sheet having a lower oxygen overvoltage than the substrate.

2. A metal-air cell as in claim 1, wherein a plurality of separators are employed, and at least one of the separators is a membrane barrier separator.

References Cited

UNITED STATES PATENTS

| | | | |
|---|---|---|---|
| 2,969,315 | 1/1961 | Bacon | 136—86 |
| 3,077,507 | 2/1963 | Kordesch et al. | 136—86 |
| 3,230,114 | 1/1966 | Friese et al. | 136—86 |
| 3,248,267 | 4/1966 | Langer et al. | 136—86 |
| 3,288,653 | 11/1966 | Holt et al. | 136—120 |
| 3,297,484 | 1/1967 | Niedrach | 136—86 |
| 3,311,508 | 3/1967 | Biddick et al. | 136—120 |
| 3,364,064 | 1/1968 | Wijburg | 29—196.6X |
| 3,438,815 | 4/1969 | Giner | 136—86 |

WINSTON A. DOUGLAS, Primary Examiner

A. SKAPARS, Assistant Examiner

U.S. Cl. X.R.

136—120